April 15, 1958   I. H. YOUNG   2,830,824
DOLLY FOR MOVING PARKED VEHICLES
Filed Aug. 29, 1955
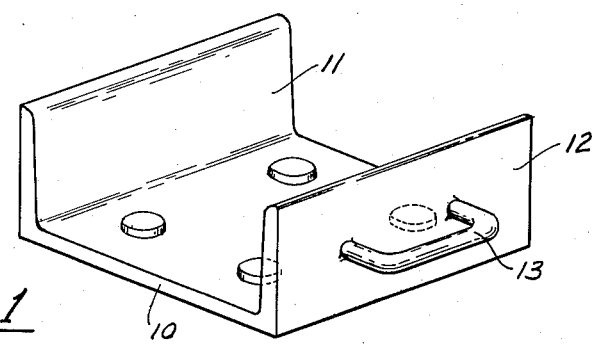
Fig. 1
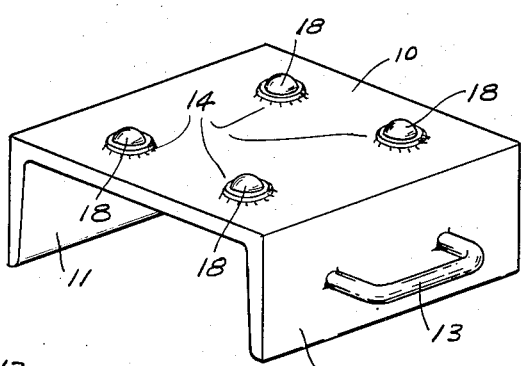
Fig. 2
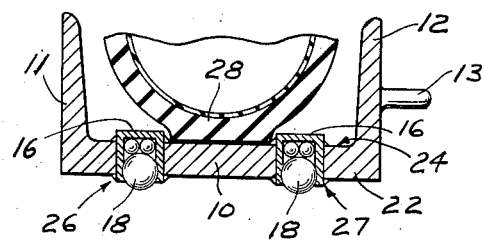
Fig. 3
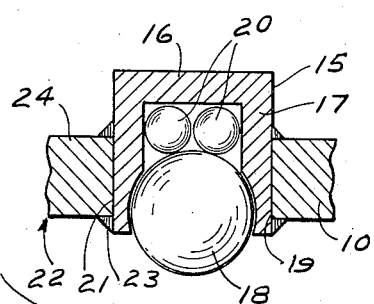
Fig. 4
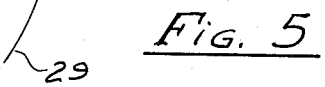
Fig. 5
INVENTOR.
IRVING H. YOUNG
BY George Spector
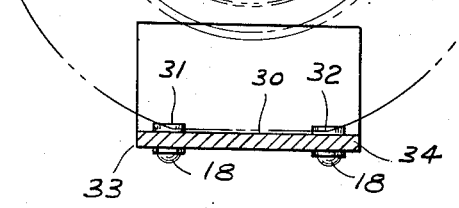
AGENT

United States Patent Office 2,830,824
Patented Apr. 15, 1958

2,830,824

DOLLY FOR MOVING PARKED VEHICLES

Irving H. Young, Brooklyn, N. Y.

Application August 29, 1955, Serial No. 531,130

1 Claim. (Cl. 280—79.1)

This invention relates to a dolly adapted to facilitate the moving of heavy objects and particularly adapted to facilitate the lateral movement of heavy vehicles.

Situations arise where it becomes necessary to move a vehicle at right angles to its longitudinal axis in a restricted space which is too small to permit using the normal turning movement of the vehicle. For example in loading vehicles in the hold of a ship, the vehicle is rolled longitudinally to the position where it is to be parked and then rotated to a transverse position parallel and closely adjacent to previously parked vehicles. It is impossible with the available clearances to maneuver the vehicles into the desired position solely thru the use of the steering wheel. The turning radius required to steer the vehicle into place is considerably greater than the available space. Consequently in actual practise the rear end of the vehicle is pivoted bodily by a large crew of men about the front wheels until the vehicle is in the desired position. In addition to requiring an excessive amount of labor, this process frequently results in costly damages to the vehicles.

The instant invention is a sturdy dolly which is especially adapted for insertion under vehicle wheels to facilitate the manual process of moving the vehicle to the desired transverse position. The dolly comprises a channel section provided with ball rollers rotatably mounted on the under surface of the dolly. The flanges of the channel guide and retain the wheel within the dolly and the rollers permit lateral movement of the vehicle without much effort. The web of the dolly is fairly close to the floor being spaced therefrom by approximately half a roller diameter. The front and rear edges of the dolly are spaced from the rollers whereby a vehicle wheel can easily be mounted on the dolly by engaging the edge of the dolly. Such engagement tilts the dolly about the rollers as a fulcrum and further forward vehicle movement will bring the wheel to the center of the dolly causing the dolly to return to its normal vertical position. The vehicle brakes are applied to retain the vehicle in its position upon the dolly. When so mounted a single person can pivot the vehicle to a transverse position.

The dolly also includes projections along the upper surface of the web which are positioned to retain the wheel in a central position on the dolly.

It has been found by actual experiment that the time required to park a vehicle transversely in the hold of a ship while using the instant invention is only twenty-five percent of the time required without the aid of the instant invention. Moreover the device permits the loading crew to have complete and steady control over the movement of the vehicle resulting in the complete elimination of damages which frequently occur without the use of the device. Moreover the number of men required for the operation can safely be reduced from 6 or 8 men to 2 men.

Although the instant device is particularly useful in connection with the loading of vehicles, it should be understood that its use can be extended to other objects such as furniture, pipes, logs, beams, or the like.

Consequently it is the object of this invention to provide an inexpensively fabricated dolly adapted for rapid and simple insertion under the wheels of a heavy vehicle which will retain the vehicle upon the dolly thereby greatly reducing the effort required to move the vehicle laterally.

Another object of this invention is a dolly having ball rollers which can be easily mounted under the wheels of a vehicle by simply rolling the wheels on the dolly.

A further object of this invention is a sturdy inexpensive dolly equipped with ball rollers and lateral abutments for retaining a vehicular wheel centrally on the dolly.

Further objects and advantageous features of this invention will be more fully understood from the following detailed description and annexed claims when read in the light of the attached drawings in which:

Figure 1 is a perspective view of the novel dolly.

Figure 2 is a transverse section thru the ball casters showing a portion of a vehicular wheel mounted on the dolly.

Figure 3 is an inverted perspective view of the dolly, showing the ball casters projecting from the underside.

Figure 4 is a longitudinal section thru the centerline of the dolly showing in phantom a portion of a vehicular wheel mounted on the dolly.

Figure 5 is an enlarged sectional view of the method of mounting the ball casters on the dolly frame.

Referring now to Figures 1 and 3, the novel dolly is seen to comprise a channel section, preferably of steel, having a web 10 and spaced parallel flanges 11 and 12 projecting transversely from opposite sides of the web. A handle 13 is secured rigidly to one of the flanges 12 for handling purposes. A plurality of spaced ball caster assemblys 14 are rigidly secured to the web 10 in a manner to be described.

As better seen in Figure 5, the caster assembly comprises a cylindrical housing 15 having an end wall 16 and a cylindrical side wall 17. A relatively large ball 18 is swivelly retained within the outer end 19 of the wall 17. The outer end 19 slidably encompasses the ball below the principal axis of the ball as seen in Figure 5 thereby preventing the ball from leaving the housing and permitting a portion of the ball to project outside of the housing for contact with a supporting surface such as a floor or the like. The ball 18 is spaced from the end wall 16 sufficiently to permit the insertion of a number of smaller balls 20. The balls 20 are circumferentially arranged adjoining the interior surface of wall 17 and abut the wall 16 on one side and the large ball 18 on the other side providing a relatively frictionless support for the inner surface of ball 18.

The caster assembly is mounted on the web 10 by inserting the housing 15 thru a hole 21 in the web. The outer end 19 projects sufficiently beyond the outer web surface 22 to provide an adequate abutment for the welded seam 23 joining the web to the outer end 19. The end wall 16 of the housing projects sufficiently above the inner web surface 24 to provide guiding abutment for a vehicular wheel as will be described. The diameter of the balls 20 are great enough to prevent bearing contact between the ball 18 and the cylindrical wall 17. Thus the weight of the load on the dolly is transmitted on the floor solely thru the balls 20 and the large ball 18. It is apparent then that the frictional forces impeding the rotation of the ball 18 are reduced to a minimum.

In Figure 2 a portion of a vehicular wheel is shown in position on the dolly. The caster assemblies 26 and 27 are spaced sufficiently to snugly receive the wheel thread 28 providing a means for guiding the wheel to the dolly center and retaining the wheel thereat. The spacing of the flanges 11 and 12 is adapted to receive vehicular wheels of all dimensions ranging from jeeps to trucks. The said flanges also assist in guiding the wheel onto the dolly and prevent the wheel from sliding or moving laterally off the dolly. As is seen in Figure 1, four caster assemblies are provided which enclose a central substantially rectangular area. To prevent tipping of the dolly when a wheel is mounted thereon, it is important that the wheel be retained over the center of gravity of the dolly. The end walls 16 of the caster assemblys project sufficiently above the inner web surface 24 to provide convenient abutments for guiding the wheel to a position over the center of gravity of the dolly and also retaining the wheel in such position when the vehicle is being parked. The spacing of the abutments will accommodate the threads of conventional vehicular wheels. Furthermore the abutments also function to align elongated objects such as pipes or beams with the dolly axis thereby distributing equal loads to the caster balls.

In Figure 4 a wheel 29 is shown in place on the dolly with the bearing surface of the wheel thread 30 accurately in alignment with the gravity axis of the dolly and abutting at opposite ends pairs of caster assemblys 31 and 32.

To mount the wheel 29 on the dolly (Figure 4) the dolly is placed with its longitudinal axis in alignment with the axis of the wheel. The vehicle is then rolled towards the dolly and directed between the flanges 11 and 12. The caster assemblies 31 and 32 are sufficiently spaced from adjacent ends 33 and 34 of the dolly so that when the wheel engages one of these ends the dolly tilts longitudinally about the respective adjacent caster assemblies until the dolly end contacts the floor enabling the wheel to roll up the inclined inner surface 24 of the web 10. When the wheel reaches the position shown in Figure 4, the dolly resumes its normally vertical position with the web 10 in horizontal position.

By mounting the rear wheels of a vehicle on a pair of dollys, it becomes a simple matter to move the rear of the vehicle transversely to pivot the vehicle about the front wheels. During such movement the brakes are applied preventing the wheels from leaving the dollies. Due to the disclosed ball bearing mounting of the ball casters 18 a minimum of frictional resistance is offered to the movement of the dollies when loaded with extremely heavy vehicles such as trucks. The use of ball casters in the manner disclosed maintains the dolly supporting surface (24) at a minimum distance from the floor thereby facilitating the mounting and dismounting of the wheels on and off the dollies.

To remove the dolly from beneath the vehicle, it is only necessary to release the brakes and roll the wheels off the dolly. A slight movement of the mounted wheel causes the dolly to tilt as described above providing an inclined plane for the complete descent of the wheel from the dolly.

Thus in a matter of seconds the dollys can be mounted under the vehicular wheels or removed therefrom.

Fabrication of the device is accomplished simply by providing a channel section of adequate dimensions, cutting or drilling holes thru the web for the reception of the caster assemblys in the holes as shown in Figure 5. There are no complicated parts, the caster assemblies are easily replaceable and the structure is adapted for rugged service.

It is now apparent that an inexpensive dolly construction has been disclosed which will effect great savings in time labor and the prevention of damages involved in the loading of heavy objects such as vehicles.

It should be further noted that, although the embodiments shown are preferred forms, the many other variations attainable by a skilled mechanic are regarded as falling within the scope of the invention.

Having thus described in detail the nature of the invention, a grant of Letters Patent is desired for the novelty disclosed herein and as defined in the following claim.

A dolly adapted to transport objects over rough surfaces comprising a support plate and ball rollers mounted rotatably in the plate with portions of the rollers protruding from the plate including means for guiding, assisting and retaining the said objects on the plate wherein the plate has upper and lower spaced parallel sides bounded by spaced front, rear and lateral edges, the said plate including a plurality of apertures and a plurality of sockets extending through the said apertures and projecting below the lower side and above the upper side of said plate, said sockets retaining said rotatable ball rollers therein to support the said plate above the rough surfaces to be traversed with a minimum clearance and permitting movement of the plate relative to the surface, each of said sockets comprising a cylindrical cup secured in a corresponding one of said apertures, including ball bearings in said cup and disposed to contact said rollers, said cup being provided with spherically countoured walls dimensioned to surround a substantial portion of the roller thereby retaining the roller in the cup, the said ball bearings transmitting the load from the plate to the rollers thereby preventing said contoured walls from transmitting stress to said rollers, the said sockets being spaced from the front and rear edges of said plate whereby the said edges will tilt when engaged by the load to provide an inclined upper side, and said means for guiding, assisting and retaining the said objects on the plate comprising spaced flanges extending from said upper side adjacent said lateral edges.

References Cited in the file of this patent

UNITED STATES PATENTS

| | | |
|---|---|---|
| 429,657 | Spivey | June 10, 1890 |
| 1,649,721 | Mohler | Nov. 15, 1927 |
| 1,761,453 | Rankin | June 3, 1930 |
| 1,900,867 | Olds | Mar. 7, 1933 |
| 2,440,527 | Talley | Apr. 27, 1948 |
| 2,610,750 | Hulbert | Sept. 16, 1952 |
| 2,719,043 | Oppenheimer | Sept. 27, 1955 |

FOREIGN PATENTS

| | | |
|---|---|---|
| 1,024,531 | France | Jan. 10, 1953 |
| 147,175 | Switzerland | Aug. 1, 1931 |

OTHER REFERENCES

Advertisement "Kar-Kart" on page 135 in the March 1949 issue of "Motor Age" publication.